(12) United States Patent
Farmanbar

(10) Patent No.: US 10,110,468 B2
(45) Date of Patent: Oct. 23, 2018

(54) SYSTEM AND METHOD FOR SEMI-STATIC TRAFFIC ENGINEERING

(71) Applicant: Hamidreza Farmanbar, Ottawa (CA)

(72) Inventor: Hamidreza Farmanbar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 15/170,503

(22) Filed: Jun. 1, 2016

(65) Prior Publication Data

US 2017/0353379 A1   Dec. 7, 2017

(51) Int. Cl.
| H04L 12/729 | (2013.01) |
| H04L 12/801 | (2013.01) |
| H04L 12/26 | (2006.01) |
| H04L 12/24 | (2006.01) |
| H04L 29/06 | (2006.01) |
| H04L 29/08 | (2006.01) |

(52) U.S. Cl.
CPC ........ H04L 45/125 (2013.01); H04L 41/0883 (2013.01); H04L 43/0882 (2013.01); H04L 47/127 (2013.01); H04L 47/17 (2013.01); H04L 63/1408 (2013.01); H04L 67/1002 (2013.01)

(58) Field of Classification Search
CPC . H04W 28/12; H04W 24/00; H04W 72/1289; H04L 45/04; H04L 47/10; H04L 47/22
See application file for complete search history.

(56) References Cited

U.S. PATENT DOCUMENTS

| 2004/0008707 | A1 | 1/2004 | Nakamichi et al. |
| 2013/0286846 | A1* | 10/2013 | Atlas .................. H04L 45/34 370/236 |
| 2014/0003232 | A1* | 1/2014 | Guichard ............ H04L 67/16 370/230 |
| 2015/0195745 | A1 | 7/2015 | Farmanbar et al. |
| 2017/0168985 | A1* | 6/2017 | Hwang ................ H04L 43/028 |

FOREIGN PATENT DOCUMENTS

| CN | 103179035 A | 6/2013 |
| CN | 103379042 A | 10/2013 |

OTHER PUBLICATIONS

International Search Report dated Aug. 7, 2017 for corresponding International Application No. PCT/CN2017/085941 filed May 25, 2017.

* cited by examiner

Primary Examiner — Mewale Ambaye

(57) ABSTRACT

A method and application function for managing data flows in a network comprising a plurality of nodes. The method comprises generating a number N of network load representatives (NLRs) of an expected loading of the network, identifying a path selection configuration for the data flows for each of the N NLRs and mapping a prevailing network loading to a selected one of the N NLRs. If the selected NLR is different from a currently selected NLR, the method triggers traffic engineering (TE) by implementing the path selection configuration of the selected NLR at nodes affected thereby. The application function may comprise an NLR generator, a path optimizer and an NLR mapper.

21 Claims, 9 Drawing Sheets

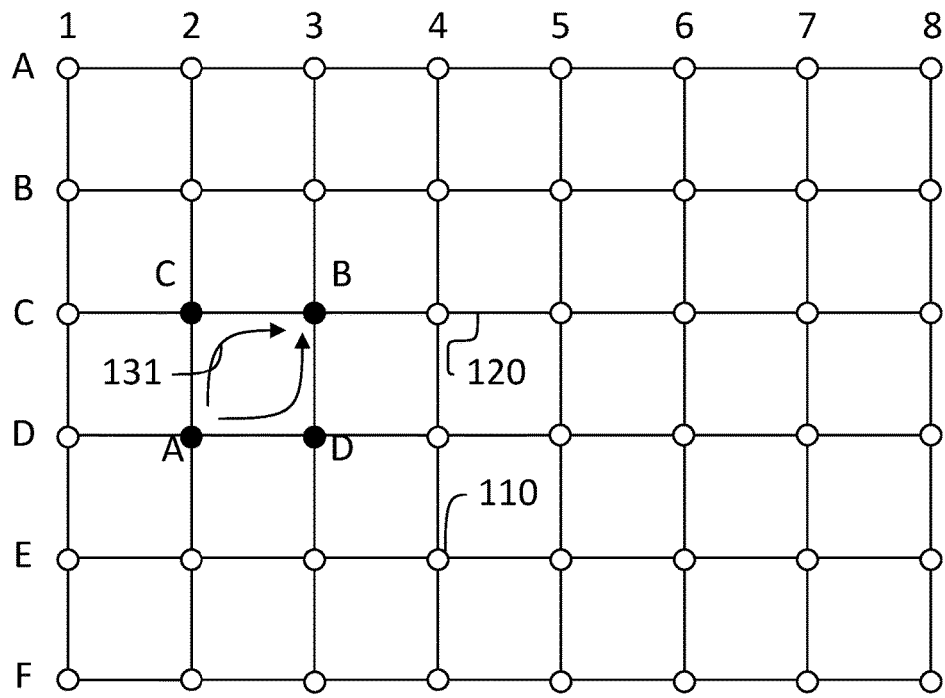
PRIOR ART  Fig.1
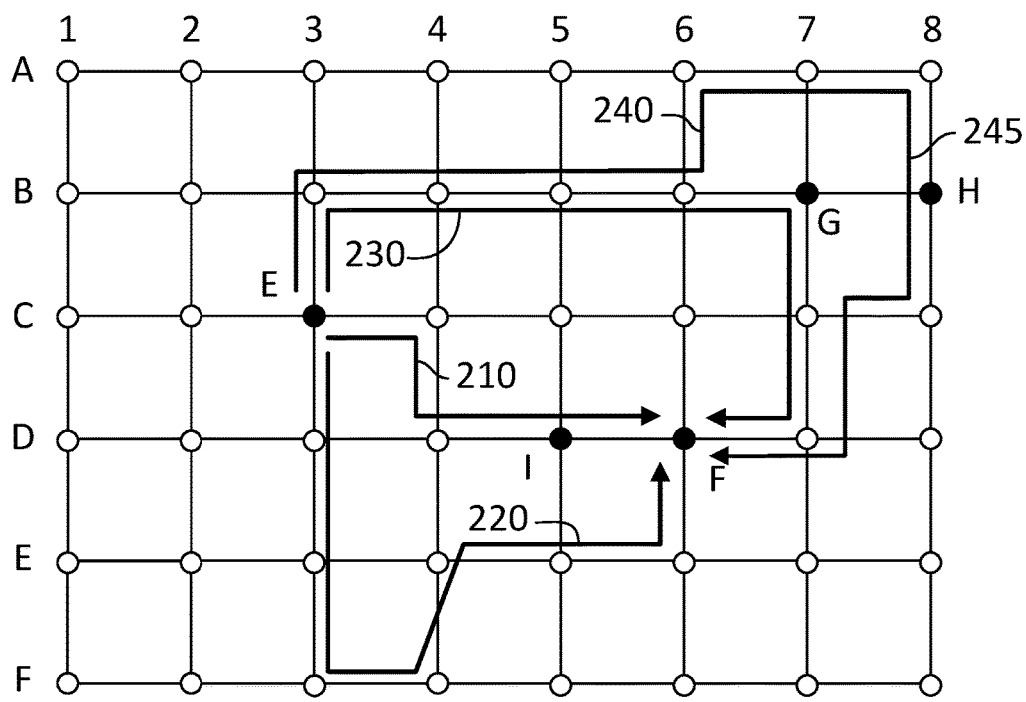
PRIOR ART  Fig.2

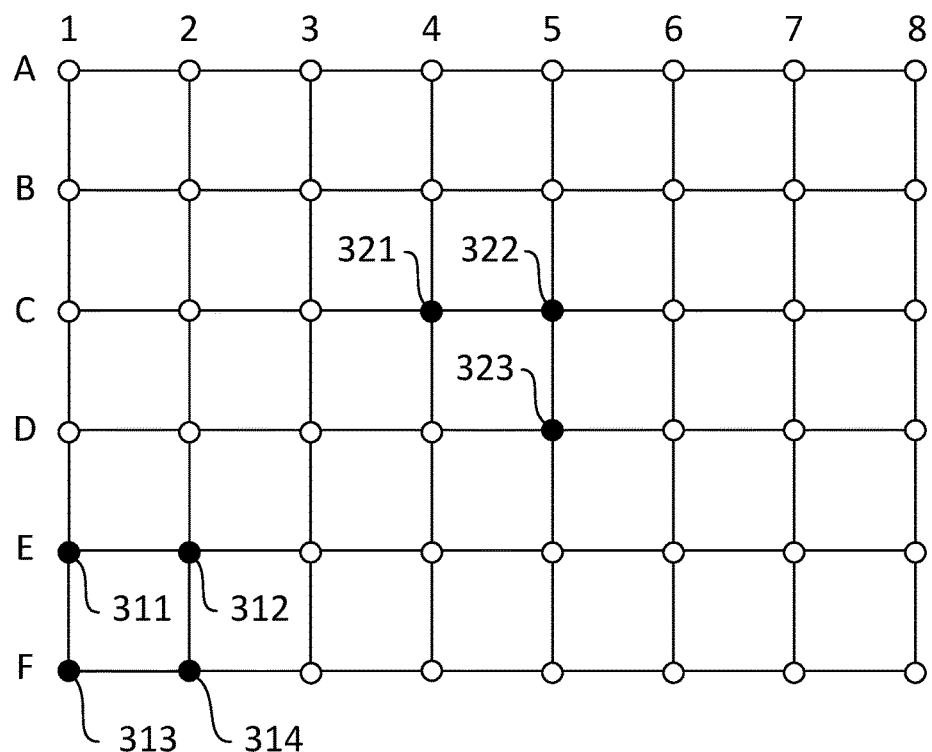
PRIOR ART  Fig.3

SYSTEM AND METHOD FOR SEMI-STATIC TRAFFIC ENGINEERING

TECHNICAL FIELD

The present disclosure relates to traffic engineering in a telecommunications network and in particular to a system and method for reducing triggers in semi-static traffic engineering.

BACKGROUND

Traffic on a telecommunications network is governed by data flows. A data flow is a transfer of data from a source node to a destination node. A destination node may be connected to a source node by one or more intermediate nodes. In some example embodiments, an intermediate node may be a router.

A given node may act as one of a source node, a destination node or an intermediate node in respect of a first flow and as a different one in respect of a second flow.

FIG. 1 shows an example fragment of a telecommunications network 100. The network 100 comprises a plurality of nodes 110 interconnected by links 120. For purposes of illustration, the nodes are shown in an array of 6 rows labelled A-F and 8 columns labelled 1-8, so that a given node may be referenced by a row and column reference. Those having ordinary skill will appreciate that while the network fragment is shown as a rectangular array of nodes 110, with links 120 between consecutive nodes in the same row and/or column, and are labelled in such fashion, the nodes 110 and the links 120 between them are not typically so aligned, nor are the nodes 110 typically so labelled.

Not every node 110 is directly connected to another node 110 by a link 120. For example, nodes A(D2) and B(C3) are not directly connected by a link 120. Rather, there are a plurality of paths between them, each comprising one or more links 120 to intermediate nodes. In the figure, two such paths A-C-B 131, A-D-B 132 are shown, each passing through a different intermediate node C(C2), D(D3). If nodes A and B are considered to be the source node and destination node respectively of a flow, then node C or D (depending upon which of the two paths 131, 132 is being considered), will be an intermediate node.

As is shown in FIG. 1, in connection with node A, a node that is a source node in respect of one flow can be a source node in respect of another flow, whether or not such flow has the same destination node. Similarly, as is shown in FIG. 1, in connection with node B, a node that is a destination node in respect of one flow can be a source node in respect of another flow, whether or not such flow has the same source node.

Further, a node that is an intermediate node in respect of one flow may be an intermediate node in respect of another flow, whether or not such flow has the same source or destination node. Still further, a node 110 that is a source node in respect of one flow may be a destination node or an intermediate node in respect of another flow. Moreover, a node 110 that is a destination node in respect of one flow may be a source node or an intermediate node in respect of another flow, and a node 110 that is an intermediate node in respect of one flow may be a source node or a destination node in respect of another flow.

Turning now to FIG. 2, there are shown nodes E(C3) and F(D6), with a number of paths 210, 220, 230, 240 between them. Each of the paths 210, 220, 230, 240 are of different length. Paths 210, 220, 230 as well as paths 210, 220, 240 do not pass through any common intermediate nodes and are each of a different length (measured by number of intermediate nodes). Path 240 shares common intermediate nodes with path 230, with the exception of node G(B7), which is used in path 230 to move from node B6 to C7, but not in path 240. Rather, path 240 moves from along a sub-path 241 fragment B6-A6-A7-A8-B8-C8-C7.

A given flow may become active at a point in time and be deactivated at another point in time. Between activation and deactivation of a flow, the amount that the flow is used gives rise to a load associated with the flow. The load of a flow may change over time. The total load of all flows passing through a given node is known as the network load for such node.

The network may support one or more services. Referring now to FIG. 3, there is shown a schematic view of a plurality of originating nodes and a plurality of destination nodes that may be associated with an example service. Each service tends to have associated with it a number of potential flows. In some cases, the flows associated with a given service may originate from one or more nodes 110, such as, by way of non-limiting illustration, nodes 311-314 and/or may terminate at one or more nodes 110, such as, by way of non-limiting illustration, nodes 321-323. By way of non-limiting example, the service may be a machine-type communication (MTC) service serving a utility, in which case, the originating nodes may be an MTC sensor or an access point (AP) to which such MTC sensor is connected, in a given geographic region and the destination nodes may be an AP or a point of presence (PoP) associated with a service provider to which the utility may be a subscriber. Thus, at any given time, there may be one or more flows from one or more of the originating nodes 311-314 to one or more of the destination nodes 321-323. The knowledge of about which flows are currently active or inactive is generally available, at least as a statistical concept.

Each such flow, when active, will follow a path from the originating node 311-314 to the destination node 321-323 associated therewith, with generally little or no restriction on what intermediate nodes will define such path.

Traffic engineering (TE) is a method of optimizing the performance of a network by dynamically analyzing, predicting and regulating the behaviour of data flows, whether or not associated with a given service, transmitted along the network 100. TE methods seek to minimize delay or data failure as the network load increases by changing the routing of flows through intermediate nodes subject to network constraints and in accordance with network performance objectives. Such routing changes are effected through control signalling, such as from a Software-Defined Network (SDN) Controller (SDN-C) to a router.

From time to time, the routing of flows may be altered or considered for alteration, by way of non-limiting example, because of change in demands of data flows. In such instances, TE is said to be triggered. The frequency of TE triggers may itself impact the overall performance of the network 100. If TE is only infrequently triggered, traffic bottlenecks may develop which may adversely impact network performance. On the other hand, by increasing the frequency of TE, the determination of whether or not to alter the routing of flows will increase. In some cases, such determination imposes a computational load that may adversely impact network performance. Potentially more significantly, a determination to alter the routing of flows consequent on a TE trigger will impose a control signalling load to effect the routing alteration itself.

Such tension may be managed by controlling the frequency and/or conditions that may trigger TE. A number of TE approaches have been employed. Some approaches can be categorized by the frequency of the TE triggers. Static TE involves a single initial global TE trigger, or in some cases, an infrequent (by way of non-limiting example, periodic) TE trigger. By contrast, dynamic TE is characterized by triggering TE trigger globally throughout the network 100 whenever a flow becomes active or is deactivated. This may be problematic if there are a lot of flow activations and/or deactivations, especially but not limited to services supporting MTC, since typically MTC services are characterized by a very large number of short-lived flows. Other scenarios that are characterized by a very high flow arrival rate may also result in a high frequency of TE triggers.

Semi-static TE represents a trade-off between the extremes of static and dynamic TE, in that a subset of circumstances is identified, the occurrence of one or more of which triggers a TE assessment.

Other TE approaches can be characterized by what happens when TE is triggered. Typically when TE is triggered, a path is selected for each active flow in the network, that is, a path between an originating node and a destination node, through zero or more intermediate nodes, is identified. Once the paths have been selected, routing changes are propagated to routers in the network through control plane signalling to give effect to the path changes so identified.

In some cases, path selection is computed at the time of the TE trigger. In some cases, path selection is pre-computed accessed at the time of the TE trigger. The advantage of pre-computing path selection is that the computational load in path selection is avoided at the time of the TE trigger. However, because path selection occurs a priori, the method of selecting the path typically does not take into account the prevailing network loading at the time of the TE trigger. This may limit the availability of a subset of path selection methods.

The most complete path selection method that could be taken is known as joint optimization of paths. In such action, when TE is triggered, every flow is considered, along with its associated network load to optimize paths of flows through intermediate nodes such that the overall network performance is optimized. For a given flow, this may mean that a longer path may be called for, to avoid a traffic bottleneck at a given intermediate node because of constraints imposed by one or more other flows.

By way of non-limiting illustration, in FIG. 2, if the flow under consideration extends from originating node E to destination node F, any of paths 210, 220, 230, 240 may be a suitable path for the flow to follow.

If however, there is a bottleneck imposed at node G because the node is inoperative, or because a flow (by way of non-limiting illustration, from originating node H(B8) to destination node G) cannot be re-routed away from node G, path 240 may be considered to be the optimal path for the flow from node E to node F, even if path 230 (and indeed paths 210, 220) is shorter (in terms of number of intermediate nodes).

However, joint optimization of paths has been identified as having a computational complexity of Non-deterministic Polynomial-time hard (NP-hard), assuming a fixed number of paths per flow. As such, it is not feasible to perform joint optimization of paths when TE is triggered.

Nor is it feasible to perform joint optimization of all paths on a pre-computation basis since joint optimization takes into account the prevailing network load, and this will not be known at the time of computation.

More simplified approaches to path selection are available. A very simple such approach is known as "shortest path". The approach takes into account a cost associated with each link 120 in each path. In such an approach, each flow is defined by the path that has the lowest associated cost, that is, the sum of the cost of links 120 that make up the path. In an example situation, where all links 120 have a common cost, the shortest path will be the path that has the least number of links 120 for the flow.

By way of non-limiting illustration, in FIG. 2, if the flow under consideration extends from originating node E to destination node F, and all links 120 shown have a common cost, of the four paths shown 210, 220, 230, 240, path 210 will be chosen as the shortest path.

The simplicity of such an approach is rooted in the fact that the path selection of a given flow is independent of the number or nature of other active flows. Consequently, the shortest path approach does not depend upon the network loading, which may include performance bottlenecks at a node 110 and/or a link 120 (by way of non-limiting example, when a large number of flow paths share a common link 120). By way of non-limiting illustration, path 210 would still be chosen under the shortest path approach, even if node I(D5) posed a significant performance bottleneck due to network loading.

Because the shortest path approach is independent of network loading, TE triggers can be avoided and the path selection can be pre-computed and implemented at the outset.

Other simplified approaches include approaches based on column generation. Such approaches do take into account to some extent the existence and loading of other flows and as such may provide improved performance over the shortest path approach. However, column generation approaches are not suitable for pre-computation. Further, while simpler than the optimal joint path selection approach, column generation approaches exhibit worse performance than such approach.

SUMMARY

The present disclosure discloses a method of and an application function (AF) for performing semi-static TE. A pre-determined number of network load representative scenarios is identified and a path selection configuration is pre-computed for each such scenario. TE is triggered only when the prevailing network loading corresponds to one of such scenarios while the prevailing path selection corresponds to a different one of such scenarios. The number of pre-determined network load representative scenarios thus influences the frequency of TE triggers.

The pre-computation of path selection configurations permits look-up of the path selection configuration when TE is triggered, which substantially reduces the computational load imposed when TE is triggered.

In some example embodiments, the pre-computed path selection configurations are pre-loaded into the network's routers, which substantially reduces the control signalling load imposed when TE is triggered.

In some example embodiments, the pre-computation of a path selection configuration for each network load representative scenario involves joint optimization assuming a network load represented by the scenario under consideration. Such approach ensures that the path selection configuration is near optimal for the prevailing network load conditions.

According to an example embodiment of the present disclosure, there is disclosed a method for managing data flows in a network comprising a plurality of nodes, comprising actions of generating a number N of network load representatives (NLRs) of an expected loading of the network; identifying a path selection configuration for the data flows for each of the N NLRs and mapping a prevailing network loading to a selected one of the N NLRs.

If the selected NLR is different from a currently selected NLR, TE can be triggered by implementing the path selection configuration of the selected NLR at nodes affected thereby.

The method can further comprise repeating the action of mapping.

The action of generating can comprise quantizing a vector corresponding to each NLR and/or considering a statistical model of an expected loading of the network. The statistical model can be represented by a statistical distribution fed into a vector quantizer. The method can further comprise, if the statistical model has changed, repeating the action of generating.

The action of identifying can comprise performing joint path optimization assuming that the network loading is modelled by the associated NLR.

The method can further comprise saving the path selection configuration to a control store after the action of identifying. The action of implementing can comprise, if the control store is accessible by a TE AF, accessing the path selection configuration from the control store and sending it to an affected node, and if the control store is accessible by an affected node, sending an indication of the path selection configuration to an affected node and the affected node accessing the path selection from the control store.

The action of mapping can comprise providing an indication of the selected NLR to an SDN-C.

According to an example embodiment of the present disclosure, there is disclosed a system for managing data flows in a network comprising a plurality of nodes, comprising a TE AF and at least one control store. The TE AF comprises an NLR generator, a path optimizer and an NLR mapper. The NLR generator is for generating a number N of NLRs of an expected loading of the network. The path optimizer is for identifying a path selection configuration for the data flows for each of the N NLRs. The NLR mapper is for mapping a prevailing network loading to a selected one of the N NLRs. The at least one control store is for storing the path selection configurations for at least one of the N NLRs.

If the NLR mapper selects an NLR that is different from a currently selected NLR, the AF can trigger TE by causing the path selection configuration of the selected NLR to be retrieved from the control store and implemented at nodes affected thereby.

The at least one control store can be a central control store associated with and accessible by the AF and/or can be a distributed control store associated with and accessible by at least one of the affected nodes.

According to an example embodiment of the present disclosure, there is disclosed an AF, for managing data flows in a network comprising a plurality of nodes, comprising an NLR generator, a path optimizer and an NLR mapper. The NLR generator is for generating a number N of NLRs of an expected loading of the network. The path optimizer is for identifying a path selection configuration for the data flows for each of the N NLRs. The NLR mapper is for mapping a prevailing network loading to a selected one of the N NLRs.

If the NLR mapper selects an NLR that is different from a currently selected NLR, the AF can trigger TE by causing the path selection configuration of the selected NLR to be implemented at nodes affected thereby.

The AF can be a VNF and can comprise or form part of a SDN-C.

The statistical distribution and the NLRs can be represented as a vector of data flows and the NLR generator and/or the NLR mapper can comprise a vector quantizer. The vector quantizer of the NLR mapper can form part of the NLR generator

BRIEF DESCRIPTION OF THE DRAWINGS

Example embodiments of the present disclosure will now be described by reference to the following figures, in which identical reference numerals in different figures indicate identical elements and in which:

FIG. 1 is a schematic view of potential paths for an example flow A-B through an intermediate node C or D;

FIG. 2 is a schematic view of a plurality of potential paths for an example flow E-F;

FIG. 3 is a schematic view of a plurality of originating nodes and a plurality of destination nodes that may be associated with an example service;

DESCRIPTION

Figure 4:
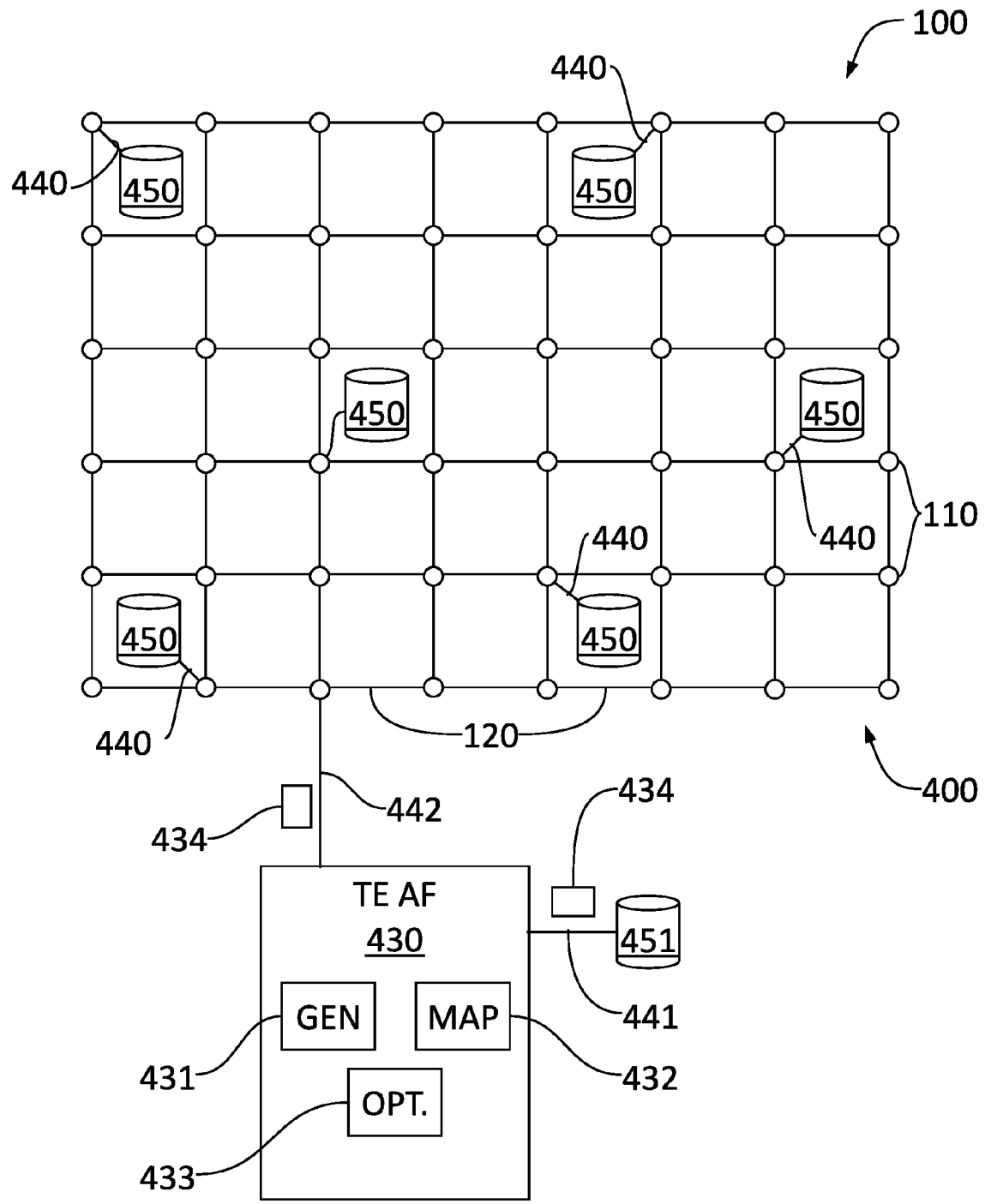
FIG. 4 is a schematic view of a system for performing semi-static TE according to an example embodiment of the present disclosure.

FIG. 4 shows a block diagram of an example embodiment of a system for performing semi-static TE in accordance with the present disclosure. The system, shown generally at 400 comprises a network or fragment thereof 100 and a TE application function (AF) 430. The network 100 that is composed of a plurality of nodes 110, such as a router, interconnected by a plurality of links 120 and operates in the data and control plane.

In the data plane, each node 110 is configured to redirect data, arriving along a second node 110 along a first link 120 interconnecting the first and second nodes 110, to a third node 110 along a second link 120 interconnecting the first and third nodes 110. Thus, a data flow comprises the flow of data originating at an originating node 110 and terminating at a destination node 110 through one or more intermediate nodes 110 in the network 100.

In the control plane, each node 110 is configured to exchange control information across its links 120 with other nodes 110, including without limitation, the TE AF 430, in the form of control signals. Such control information governs the establishment of links 120 between nodes 110 as well as establishing rules dictating how data arriving along a first link 120 is to be routed, that is if and along which other link(s) 120 such data is to be re-directed.

In some example embodiments, as shown by way of non-limiting illustration in FIG. 4, the TE AF 430 may be directly or indirectly connected by a control link 441 to a central control store 451 and directly or indirectly connected by a control link 442 to a node 110 such that control information may be retrieved from the central control store 451 and disseminated to one or more nodes 110. In some example embodiments, the central control store 451 is internal to the TE AF 430. Those having ordinary skill in this art will appreciate that in some example embodiments, those nodes 110 that are not directly connected by a control link to the TE AF 430, may be connected directly or indirectly in the control plane to one or more nodes 110 which is directly connected by control link 442 to the TE AF 430, such that each node 110 may be connected in the control plane to the TE AF 430.

In some example embodiments, one or more nodes 110 are connected directly or indirectly by a control link 440 to one or more distributed control stores 450, from which it may retrieve control information. Those having ordinary skill in this art will appreciate that in some example embodiments, those nodes 110 that are not directly connected by a control link 440 to a distributed control store 450 may be connected directly or indirectly in the control plane to one or more nodes 110 which is directly connected by a control link 440 to one or more distributed control stores 450, such that each node 110 may be connected in the control plane to a control store 450.

When a data flow is active, it has an associated flow demand that represents the demands for network resources of such data flow. The demands for network resources can include, without limitation, the computational load at each node 110 in the data flow, and/or the data throughput or flow rate through each link 120 in the data flow.

In a network 100, the prevailing network load is defined by the vector of flow demands of all flows in the network 100 at a given point in time.

The TE AF 430 may have available to it statistical data that will be able to predict and/or model network loading. Such statistical data can be obtained by measuring flow demands over time. Thus, each network load representative, which models a snap shot of example flows in the network 100, can be defined as such a vector.

The TE AF 430 performs processing associated with TE in accordance with the present disclosure. In some example embodiments, the TE AF 430 may be a virtual network function (VNF) that is scaled from cloud-based resources, on one or more existing nodes or Points-of-Presence (PoP) in the network 100 to provide a dynamic service level capability as and when appropriate. In some example embodiments, the TE AF 430 may act as or incorporate or be incorporated in an SDN-C. In some example embodiments, the TE AF 430 may be distributed across a number of instantiations throughout the network 100.

In some example embodiments, the TE AF 430 comprises a network load representative (NLR) generator 431 and/or an NLR mapper 432 and a path optimizer 433. In some example embodiments, the central control store 451 may form part of the TE AF 430.

The system 400 has an initialization mode and an operational mode.

During the initialization mode, the TE AF 430 generates a pre-determined number of NLRs that are expected to model the prevailing network load of the network 100 during the operational mode, based upon the statistical data as to network loading available to it. In some example embodiments, the pre-determined number of NLRs is generated by the NLR generator 431.

The TE AF 430 also employs the path optimizer 433 to determine a path selection configuration 434 for each of the generated NLRs that will be implemented when the associated generated NLR is used to model the prevailing network load of the network 100. Such path selection configurations 434 are stored in at least one control store, whether one or more distributed control store(s) 450 and/or the central control store 451 through one or more control links 440-442 for retrieval during the operational mode.

During the operational mode, the TE AF 430 employs the NLR mapper 432 to map the prevailing network load of the network 100 to one of the generated NLRs. If the mapping changes from one generated NLR to another generated NLR, TE is triggered and the TE AF 430 causes the network 100 to retrieve the path selection configuration 434 associated with the newly-mapped NLR from control store(s) 450, 451 and to have the affected node(s) 110 implement it.

Initialization Mode

In the initialization mode, TE is not triggered. Rather, a set of N NLRs is identified and a path selection configuration 434 is pre-computed and associated with each NLR and stored for retrieval during the operational mode.

The value of the number N of NLRs can have implications on the performance of the network 100. The larger the value of N, the smaller the distance between adjacent NLRs.

As discussed below, during the operational mode, TE will be triggered when the NLR, that at any given time best models the prevailing network load of the network 100, changes. Thus, a first implication is that a larger value of N implies that there will be a smaller distance between adjacent NLRs, such that it could be expected that there will be a greater number of TE triggers.

A second implication is that a smaller value of N implies that there will be a larger distance between adjacent NLRs, such that it could be expected that a correlation between the prevailing network load condition and any of the N NLRs may not be very high. This may lead to degraded performance because the path selection configuration associated with a selected NLR may considerably less than optimal.

Those having ordinary skill in this art will thus appreciate that the actual value of N may be a design decision that takes into account all of the surrounding circumstances.

Figure 5:
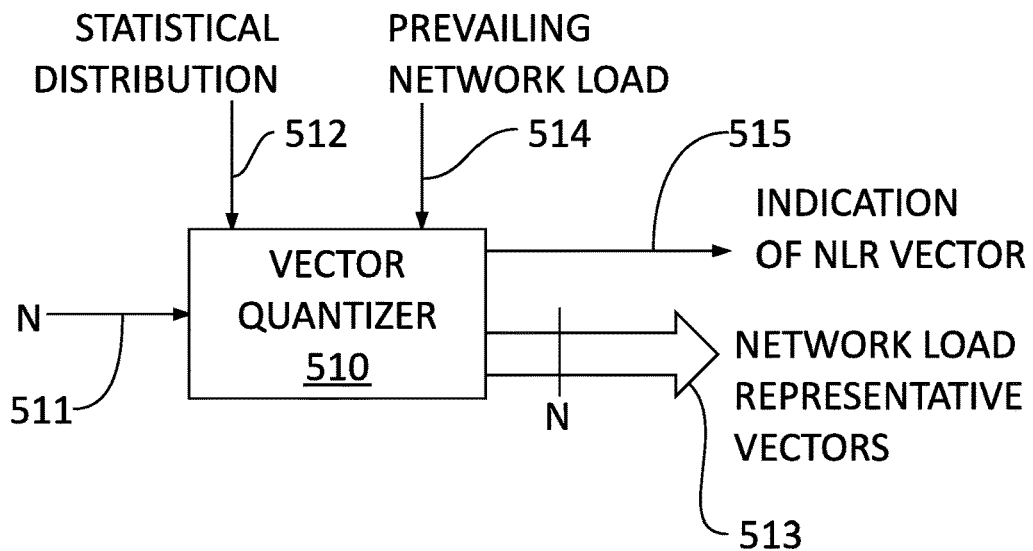
FIG. 5 is a block diagram of an example embodiment of a vector quantizer according to an example embodiment of the present disclosure.

Turning to FIG. 5, there is shown an example generator 431 of NLRs for use in the initialization mode to generate the set of N NLRs. The generator 431 may, in some example embodiments, comprise a vector quantizer 510 that itself can be operated in either or both of the initialization or the operational modes.

In the initialization mode, the vector quantizer 510 accepts as inputs, a number N of NLRs 511 and a statistical distribution 512 of network loading for the network fragment 100 under consideration and generates as output a set of quantized NLR vectors 513 that each correspond to one of the N NLRs.

The vector quantizer 510 employs vector quantization (VQ) techniques to identify and generate appropriate NLR vectors 513 based on the statistical distribution 512 of network loading and the value selected for N 511.

Once the set of N quantized NLR vectors 513 have been identified, during the initialization mode, the optimizer 433 accepts as input, each of the quantized NLR vectors 513 to pre-compute a path selection configuration 434 that is associated therewith. In so doing, the optimizer 433 takes into account the quantized NLR vector as well as knowledge regarding each flow (including the source and destination nodes) and the topology of the network 100 itself.

The path selection configuration 434 may be determined using any appropriate path selection approach. Moreover, given that each path selection configuration 434 is pre-computed during the initialization mode in the context of a full network loading scenario represented by the associated NLR vector 413, the path selection approach may, in some example embodiments, be full joint path optimization.

In some example embodiments, the path selection approach may contemplate the identification of multiple paths for each flow, with each flow carrying a fraction of the flow rate.

In some example embodiments, the path selection approach may be simplified by performing path selection on a per-service basis. In service-based path selection, service-based TE is performed to obtain link allocations. This is understood to be a low-complexity operation. Once the link allocations have been obtained, they are converted to paths for all potential flows associated with the service. In some example embodiments, a path that has the highest path allocation is chosen.

Service function chaining (SFC) is a technique in which a data flow is steered through an ordered series of service functions. Typically, each service function is located at and/or otherwise associated with a given node in the network 100 and may be responsible for specific treatment of packets. Accordingly, packets in a data flow undergo a sequence of packet treatments. SFC may simplify path selection because the ordered series of service functions dictates that data flows associated with the service in which SFC is employed will pass through the intermediate nodes with which each service function in the chain is associated.

Once a path selection configuration 434 is determined and identified with one of the quantized NLR vectors 413, it is stored in one or more control store(s) 450, 451 for later retrieval during the operational mode.

In some example embodiments, the path selection configurations 434 are stored in the central control store 451 associated with the TE AF 430 during the initialization mode. In such embodiments, when TE is triggered during the operational mode, the TE AF 430 retrieves the path selection configuration 434 associated with the NLR vector 513 that is determined to now best model the prevailing network loading from the central control store 451 and propagates it as a control flow from the TE AF 430 to affected nodes 110 which implement it.

In some example embodiments, the path selection configurations 434 are stored in the control stores 450 associated with the nodes 110 affected thereby during the initialization mode. In such embodiments, when TE is triggered during the operational mode, the TE AF 430 propagates as a control flow to affected nodes 110, an indication of which path selection configuration 434, associated with the NLR vector 513 that is determined to now best model the prevailing network loading. Each such affected node 110 thereupon retrieves the path selection configuration 434 so identified from its associated distributed control store 450 and implements it. In some example embodiments, the indication of which path selection configuration 434 is to be retrieved may be an indication 515 of the NLR vector 513, as discussed below.

Whether the control flow from the TE AF 430 to an affected node 110 contains the path selection configuration 434 or an indication of which path selection configuration is to be retrieved, such control flow logically proceeds from the TE AF 430 as a source node to each affected node 110 as a destination node. Those having ordinary skill in this art will appreciate that the physical path of such control flow may not be directly between the TE AF 430 and the affected node 110, but may incorporate one or more intermediate nodes 110 connected to the TE AF 430, the affected node 110 and or one or more other intermediate node(s) 110 by control links 440, 442.

When the N quantized vectors 513 and their associated path selection configurations 434 have been determined and stored, the operational mode is engaged and continues until or if it is determined that the statistical distribution 512 of network loading has changed sufficiently so as to warrant engaging the initialization mode and re-generating the set of quantized NLR vectors 513.

Those having ordinary skill in this art will appreciate that the statistical distribution 512 may change such that the initialization mode is re-engaged for a number of reasons, including without limitation, the introduction of a new service, the removal of a existing service, a change in the statistical distribution of network loading associated with one or more services, including without limitation, a change in the scope and/or number of subscribers to such service, a change in the number, location and/or characteristics of one or more nodes 110 in the network 100 and/or a change in the number, connectivity and/or characteristics of one or more links 120 interconnecting two nodes 110 in the network 100.

Those having ordinary skill in this art will appreciate that when the initialization mode is re-engaged, in addition to processing a different statistical distribution 512, the value N 511 may be increased or decreased.

Operational Mode

While the operational mode is engaged, TE trigger processing may occur. At any given point in time during the operational mode, the prevailing network loading is identified with one of the N NLR vectors 513 determined during the immediately prior initialization mode. The matching of the prevailing network loading with an NLR vector 513 is obtained by selecting the NLR vector 513 that has the highest correlation with the prevailing network loading.

When and while the prevailing network loading is matched with a given NLR vector 513, the path selection configuration 434 associated with the matched NLR vector 413 is retrieved from a control store 450, 451 and implemented by affected nodes 110.

A TE trigger occurs when it is determined that the prevailing network loading now best correlates with an NLR vector 513 other than the NLR vector 513 with which is it currently matched. In such an instance, the prevailing network loading is now matched with the new NLR vector 513 (with which it now has the highest correlation) and the network 100 is reconfigured to implement the path selection configuration 434 associated with the new NLR vector 513.

Those having ordinary skill in this art will appreciate that the prevailing network loading is thus mapped to one of the N NLR vectors 513 to determine whether TE is to be triggered. Such mapping may, in some example embodiments, occur continuously. In some example embodiments, such mapping may occur upon the occurrence of an event, such as the activation and/or deactivation of a predetermined number of flows in the network 100 and/or the introduction or termination of a service. In some example embodiments, such mapping may occur periodically. In some example embodiments, such mapping may be initiated randomly, either in substitution for or in addition to the occurrence of an event or the expiry of a period.

Whenever and however such mapping occurs, those having ordinary skill in this art will appreciate that TE will not necessarily be triggered upon each comparison. Indeed, with judicious selection of the number N 511 as discussed above, the number of TE triggers and their associated control signalling overhead can be significantly reduced.

In some example embodiments, during the operational mode when such mapping occurs, the mapping may be performed by the NLR mapper 432 that maps the prevailing network loading to one of the N previously-identified NLR vectors 513. In some example embodiments, the NLR mapper 432 may comprise the vector quantizer 510 operated in the operational mode.

In the operational mode, the vector quantizer 510 accepts as inputs, the number N of NLRs 511 and a vector 514 representing the prevailing network loading for the network fragment 100 under consideration and generates as output an indication 515 of one of the N quantized NLR vectors 513 with which the prevailing network loading vector 514 is most highly correlated.

In some example embodiments, the indication 515 is a number in the range [1 . . . N] that indicates which NLR vector 513 has been selected as having the highest correlation with the prevailing network loading. In some example embodiments, the indication 515 is a pointer to where the path selection configuration 434 associated therewith is stored.

If the indication 515 indicates that a TE trigger has occurred, that is, the indication 515 has changed from one NLR vector 513 to another, the path selection configuration 434 associated therewith is propagated to affected node(s) 110 in the network 100.

As discussed above, in some example embodiments, the path selection configuration 434 associated with the NLR vector 513 identified by the indication 515 was stored in control store 451 associated with the TE AF 430 during the initialization mode and when TE is triggered during the operational mode, the path selection configuration 434 is retrieved from control store 451 and propagated to any affected node(s) 110 along control links 440, 442, whereupon the path selection configuration 434 change is implemented.

Also as discussed above, in some example embodiments, the path selection configuration 434 associated with the NLR vector 513 identified by the indication 515 was stored in a control store 450 associated with the affected node(s) 110 during the initiation mode when the path selection configurations 434 were determined. In such scenario, rather than propagating the path selection configuration 434 to the affected node(s) 110, an indicator, which in some example embodiments may be the indication 515, is propagated to the affected node(s) 110 and used by them to retrieve the stored path selection configuration 434 from their associated control store 450, whereupon the path selection configuration 434 change is implemented.

Those having ordinary skill in this art will appreciate that propagating the path selection configuration 434 to affected node(s) 110 during the operational mode involves more control path signalling. On the other hand, having the affected node(s) 110 directly retrieve the stored path selection configuration 434 from a control store 450 incurs a greater amount of control storage associated with each affected node 110.

Figure 6:
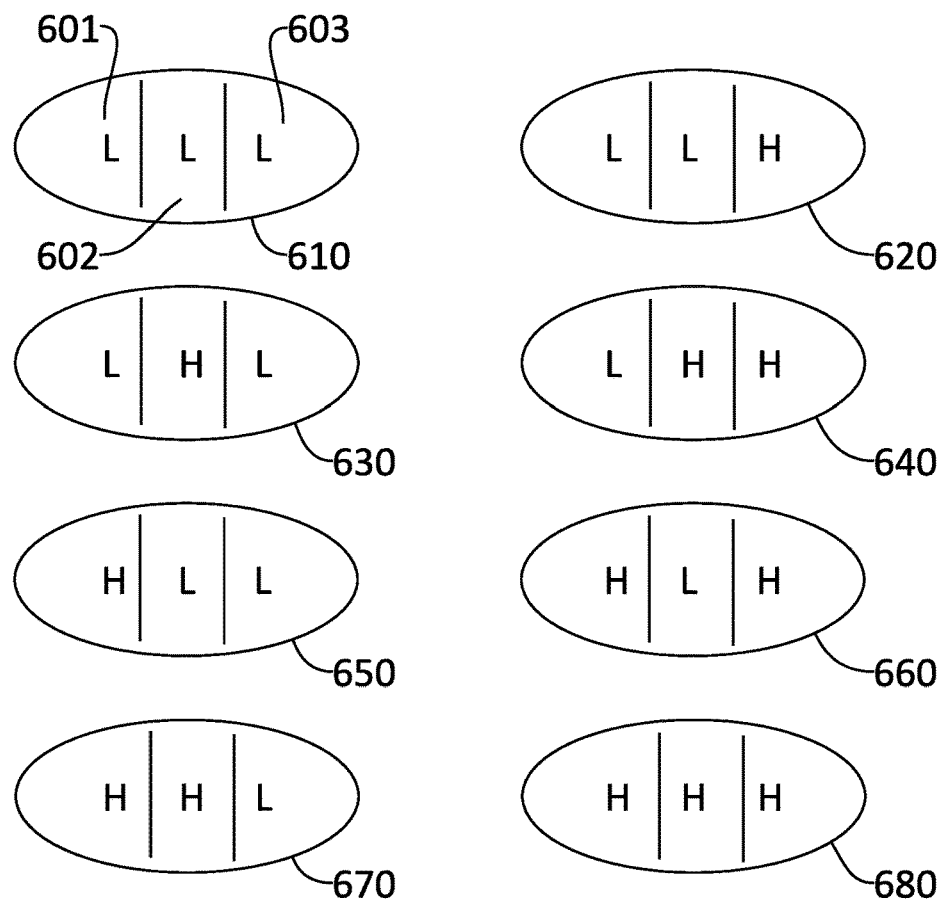
FIG. 6 is a diagram showing N=8 NLRs differentiated by three independent geographic regions each having an equal probability of high and low network loading according to an example embodiment of the present disclosure.

FIG. 6 shows an example embodiment in which the network fragment 100 is divided into three geographic regions 601, 602, 603 and the statistical distribution 512 simply corresponds to a decision as to whether the loading in a given region 601-603 is high (H) or low (L). While, as stated above, the network load and the statistical distribution 512 thereof may depend upon a large number of factors, for purposes of simplicity of illustration, assume that statistically, the network load in a given region 601-603 is independent of the network load in another region 601-603 and that there is an equal probability that the loading in a given region 601-603 will be high or low.

Thus, assuming that N=8 511, operation of the NLR generator 431 may result in a set of 8 quantized NLR vectors 513, each of which corresponds to one of the 8 possible combinations of high and low network loading for each region 601-603. Such vectors 513 are shown graphically in terms of geographical maps 610, 620, 630, 640, 650, 660, 670, 680 respectively.

Method Actions

Figure 7:
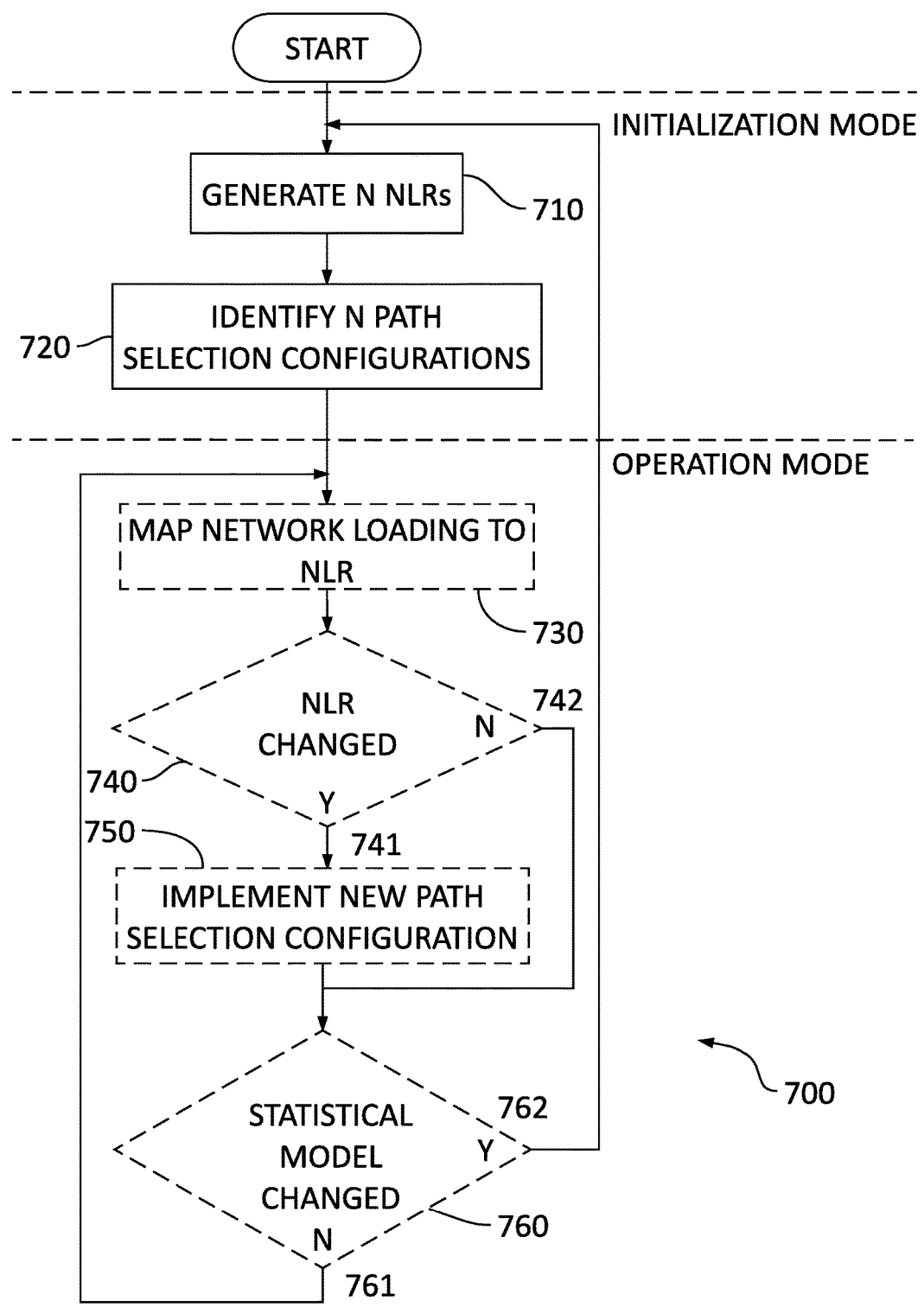
FIG. 7 is a flow chart showing example actions taken by the TE application function (AF) according to the example embodiment of FIG. 4.

Turning now to FIG. 7, there is shown a flow chart, shown generally at 700, showing example actions taken by a processor at a TE AF 430 to manage data flows in the network 100 according to an example embodiment of the present disclosure.

One example action 710 is to generate N 511 NLRs 513 of an expected loading of the network 100. In some example embodiments, the expected loading may be determined from the statistical distribution of the network loading 512. In some example embodiments, action 710 is performed by the vector quantizer 510 operating as the NLR generator 431.

One example action 720 is to identify a path selection configuration 434, for the data flows for each of the N 511 NLRs 513. In some example embodiments, action 720 is performed by the optimizer 433.

In some example embodiments, actions 710-720 occur in the initialization mode.

One example action 730 is to map the prevailing network loading to one of the N 511 NLRs 513. In some example embodiments, action 730 returns an indication 515. In some example embodiments, action 730 is performed by the vector quantizer 510 operating as the NLR mapper 432.

In some example embodiments, a determination 740 is made as to whether the action 730 of mapping indicates that the NLR 513 to which the prevailing network loading best correlates has changed. If so 741, the method 700 proceeds to action 750. If not 742, the method 700 proceeds to determination 760.

One example action 750 is to access and implement the path selection configuration 434 associated with the NLR 513 to which the prevailing network loading best correlates. In some example embodiments, action 750 involves sending the path selection configuration and/or an indicator of which path selection configuration to at least one affected node 110.

A determination 760 is made as to whether the statistical model 512 has changed such that a new set of N 511 NLRs 513 is to be generated. If no 761, the method 700 proceeds to action 730. If so 762, the method 700 proceeds to action 710.

In some example embodiments, actions 730, 750 occur in the operational mode.

Simulation Results

Figure 8:
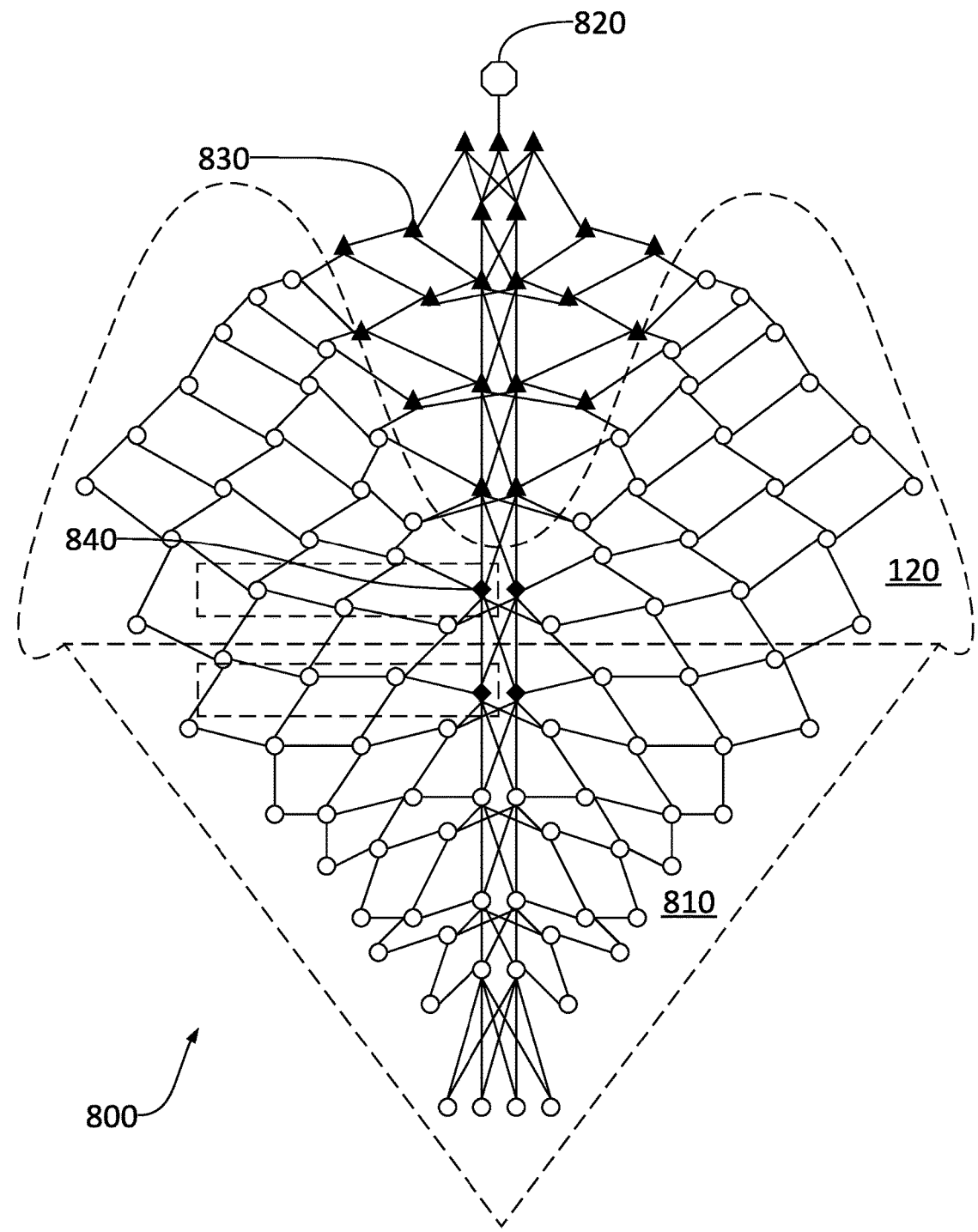
FIG. 8 is a schematic view of a network fragment in an example embodiment of a simulated uplink MTC service according to an example embodiment of the present disclosure.

Turning now to FIG. 8, there is shown an example embodiment of a network fragment 800 for use in an example uplink MTC service that was modelled for purposes of performing simulations of the performance of the system 100 and method 700. The network fragment 800 comprises a plurality (in the example, 86) of originating nodes 810, a single packet gateway (PGW) acting as a destination node 820 and a plurality of intermediate nodes comprising a plurality of SFC serving gateways (SGWs) 840 and a plurality of core routers 830. The core routers 830 are high capacity routers that are not in and of themselves originating nodes 810 of any data flows.

The simulated service postulates that each of the originating nodes 810 may initiate a data flow that passes through the network fragment 800 and terminates at the destination node 820. In keeping with the concept of SFC, each of the data flows passes through (other originating node(s) 810 in) the network fragment 800 to an associated one of the SFC SGWs 840 and from there along the core routers 830 to the destination node 820. The dashed lines identify the originating nodes 810 that are associated with each SFC SGW 840.

Three TE methodologies were employed. The first methodology comprised semi-static TE in accordance with the method 700 performed by the system 100 disclosed herein and assuming a value of N 511=1. The second methodology comprised static TE using a shortest path selection approach and served as a baseline. The third methodology comprised fully dynamic service-based TE with joint path optimization triggered at each flow activation and/or deactivation and served as an upper bound on performance.

Figure 9:
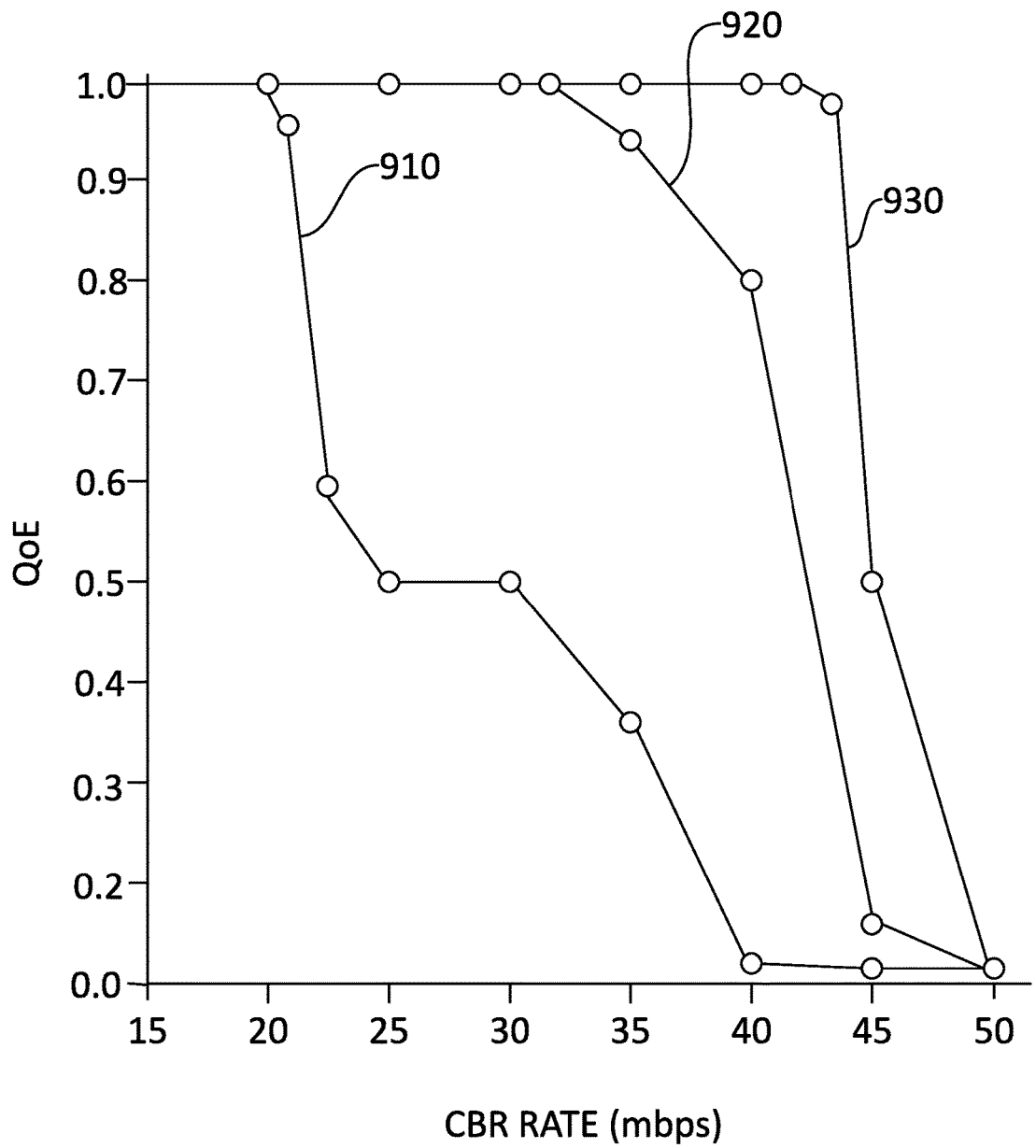
FIG. 9 is a first graph of simulated performance of the example system of FIG. 4 performing the example method of FIG. 7 compared to static TE and dynamic TE.

Turning now to FIG. 9, a first simulation is shown in which each of the originating nodes 810 was programmed to activate and deactivate data flows randomly during an enable/disable duty cycle. An exponential distribution for the enable/disable duty cycle was used. The mean length of the enable and disable portions of the duty cycle were configurable. For the simulation of FIG. 9, the duty cycle was configured to be at 50% with a period of 20 s (that is, enabled for 10 s then disabled for 10 s).

Not all originating nodes 810 have active sessions at all times. During the enable portion of the duty cycle for a given flow, the originating nodes 810 create demands for data flows for a given rate. It was assumed that there was constant bit rate (CBR) user traffic during the enable portion of the duty cycle. Even though CBR was assumed at each originating node 810, the traffic rate at the destination may vary over time because packet delays may change over time. The start and end time of the duty cycle for each flow is not synchronized.

Whenever a new flow becomes active, the TE methodologies were employed and flow allocations are updated as a result.

The traffic rate at each user with an active flow was monitored at every 50 ms interval. If it was detected that the traffic rate at the originating node 810 drops below 95% of the demand, an outage was declared on that interval.

The vertical axis shows a mean Quality of Experience (QoE) for the session. The definition of QoE of a CBR session for the simulation was to declare QoE to be 1 if the total outage intervals was less than 5% of the duration of the flow. Otherwise, QoE was declared to be 0. Thus, a QoE of a given fractional value, by way of non-limiting example, 0.99, means that on average, that fractional value of the flows exhibited consistent demand satisfaction as a measure successful delivery of the CBR to a destination node. In some example embodiments there is an inverse correlation between jitter in the delivered CBR and QoE.

The performance of the baseline static TE methodology is shown at 910. The performance of the semi-static TE system 100 in accordance with the method 700 is shown at 920. The performance of the dynamic TE methodology is shown at 930.

It may be seen that as the CBR traffic rate increases, the performance 920 of the semi-static TE system 100 in accordance with the method 700 performs identically to the upper bound 930 represented by dynamic TE for CBR values up to in excess of 30 Mbps and continues to model performance close to such upper bound until about 45 Mbps. By contrast, the baseline 910 represented by static TE begins to degrade significantly at a CBR beyond about 20 Mbps.

Figure 10:
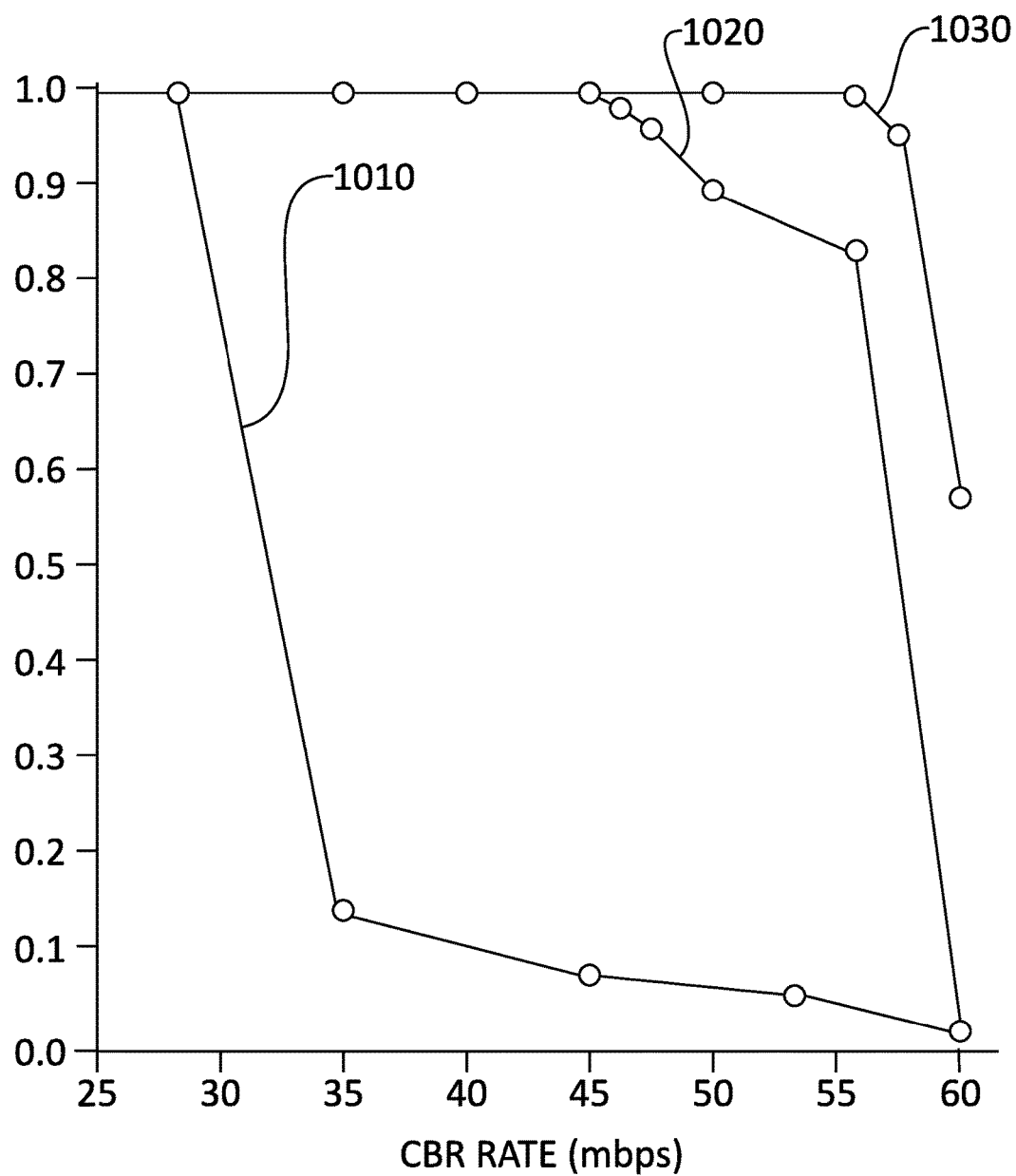
FIG. 10 is a second graph of simulated performance of the example system of FIG. 4 performing the example method of FIG. 7 compared to static TE and dynamic TE.

Turning now to FIG. 10, a second simulation is shown in which each of the originating nodes 810 was programmed to activate a data flow randomly during an enable/disable duty cycle of 33% and a period of 30 s (that is, enabled for 10 s then disabled for 20 s). The performance of the baseline static TE methodology is shown at 1010. The performance of the semi-static TE system 100 in accordance with the method 700 is shown at 1020. The performance of the dynamic TE methodology is shown at 1030.

It may be seen that as the CBR increases, the performance 1020 of the semi-static TE system 100 in accordance with the method 700 performs identically to the upper bound 1030 represented by dynamic TE for CBR values up to in excess of 45 Mbps and continues to model performance close to such upper bound until about 60 Mbps. By contrast, the baseline 1010 represented by static TE begins to degrade significantly at a CBR beyond about 28 Mbps.

Thus, while the performance of the semi-static TE system 100 in accordance with the method 700 exhibits performance close to that of the upper bound, those having ordinary skill in this art will appreciate that the computational and control signalling load will be significantly reduced from that of dynamic TE, because of the reduced number of TE triggers, the ability to pre-compute the path selection configurations 434 and in some example embodiments, to pre-load such configurations 434 into control stores 450 accessible by the affected node(s) 110.

Example Device

Having described in detail example embodiments that are in accordance with the present disclosure, it is noted that the embodiments reside primarily in combinations of apparatus or devices and processing actions related to interactions between one or more of such components.

Figure 11:
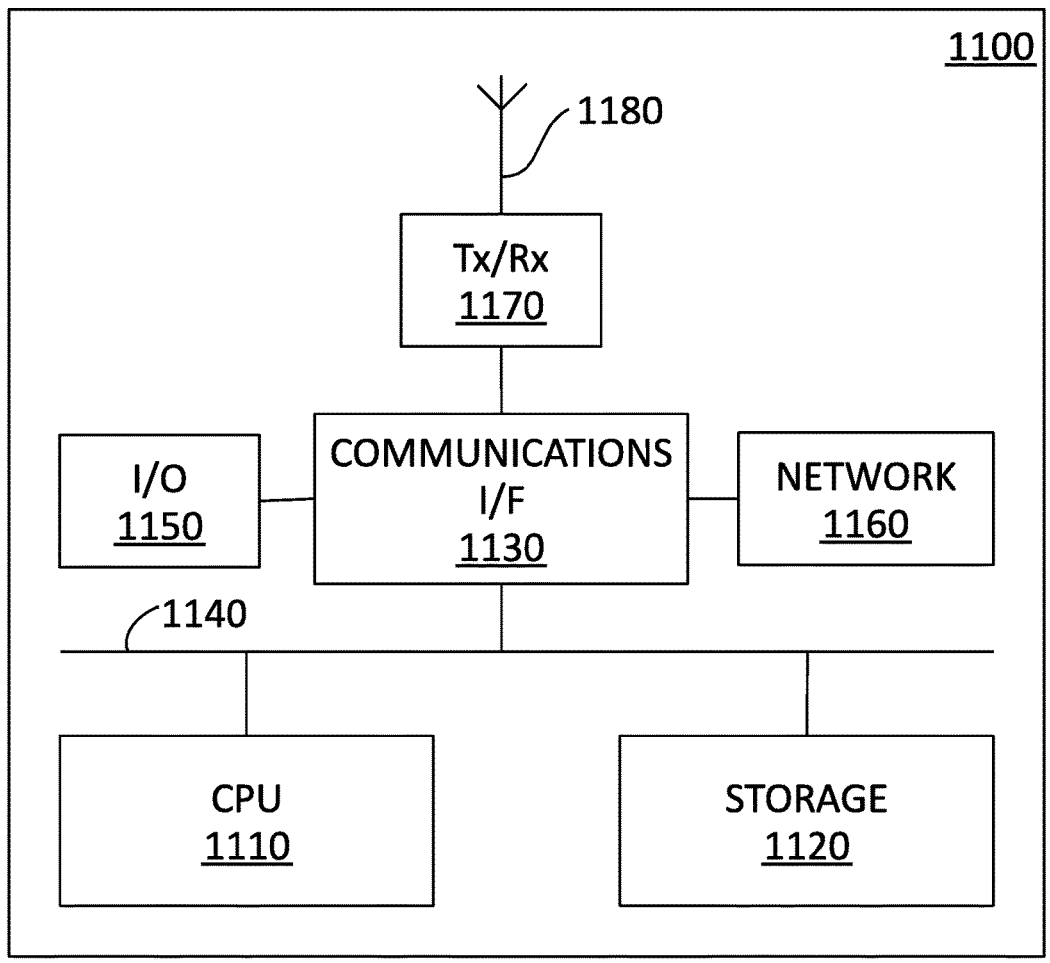
FIG. 11 is a schematic view of a processor according to an example embodiment of the present disclosure.

FIG. 11 is a block diagram of a processor that may be used for implementing one or more devices, shown generally at 1100, such as the TE AF 430 disclosed herein and for performing actions in one or more of the methods 700 disclosed herein.

The device 1100 comprises a processing unit 1110, a storage medium 1120 and a communications interface 1130. In some example embodiments, the device 1100 may also comprise a processing bus 1140 interconnecting some or all of these components, as well as other devices and/or controllers. In some example embodiments, the device 1100 may comprise an input/output (I/O) device 1150, a network connectivity device 1160, a transceiver 1170 and/or an antenna 1180.

Other components, as well as related functionality of the device 1100, may have been omitted in order not to obscure the concepts presented herein.

Terminology

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether electrically, mechanically, chemically, or otherwise.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of the device, area or volume or designated parts thereof. Moreover, all dimensions described herein are intended solely to be by way of example for purposes of illustrating certain embodiments and are not intended to limit the scope of the disclosure to any embodiments that may depart from such dimensions as may be specified.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

General

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that the present disclosure, which is described by the claims and not by the implementation details provided, which can be modified by omitting, adding or replacing elements with equivalent functional elements, provides many applicable inventive concepts that may be embodied in a wide variety of specific contexts. The specific embodiments discussed are merely illustrative of specific ways to make and use the disclosure, and do not limit the scope of the present disclosure. Rather, the general principles set forth herein are considered to be merely illustrative of the scope of the present disclosure.

It will be apparent that various modifications and variations covering alternatives, modifications and equivalents will be apparent to persons having ordinary skill in the relevant art upon reference to this description and may be made to the embodiments disclosed herein, without departing from the present disclosure, as defined by the appended claims.

Accordingly the specification and the embodiments disclosed therein are to be considered examples only, with a true scope of the disclosure being disclosed by the following numbered claims:

What is claimed is:

1. A method for managing data flows in a network comprising a plurality of nodes, comprising:

generating one or more network load representatives (NLRs) of an expected network load of the network, wherein the expected network load of the network is indicative of flow demands for all the data flows in the network;

determining a path selection configuration for all the data flows for each of the NLRs and storing the path selection configuration identified for each corresponding NLR in association with the corresponding NLR; and mapping a prevailing network load of the network to one of the NLRs, wherein the prevailing network load of the network is indicative of prevailing flow demands for all the data flows in the network.

2. The method according to claim 1, further comprising: in response to determining that the prevailing network load has changed, triggering traffic engineering (TE) by mapping the prevailing network load to a different one of the NLRs, and implementing the path selection configuration associated with the different one NLR at nodes affected thereby.

3. The method according to claim 1, wherein the generating comprises quantizing a vector corresponding to each NLR.

4. The method according to claim 1, wherein the generating comprises generating the one or more NLRs based on a statistical model of the expected load of the network.

5. The method according to claim 4, wherein the statistical model is represented by a statistical distribution fed into a vector quantizer.

6. The method according to claim 4, further comprising, after determining that the statistical model has changed, repeating the generating.

7. The method according to claim 1, wherein storing comprises saving each NLR in association with the path selection configuration identified for the NLR to a control store.

8. The method according to claim 7, wherein implementing comprises at least one of:

if the control store is accessible by an affected node, sending an indication of the one path selection configuration mapped to the prevailing network load to the affected node and the affected node accessing the one path selection configuration from the control store; and if the control store is accessible by a traffic engineering (TE) entity, accessing the one path selection configuration mapped to the prevailing network load from the control store and sending the one path configuration to the affected node.

9. The method according to claim 1, wherein mapping comprises providing an indication of the one NLR mapped to the prevailing network load to a software-defined network (SDN) controller (SDN-C).

10. A system for managing data flows in a network comprising a plurality of nodes, comprising:

an traffic engineering (TE) entity comprising:

an NLR generator for generating one or more network load representatives (NLRs) based on an expected network load of the network;

a path optimizer for determining a path selection configuration for all the data flows for each of the NLRs; and an NLR mapper for mapping a prevailing network load of the network to one of the NLRs, wherein the prevailing network load of the network is indicative of prevailing flow demands for all the data flows in the network; and at least one control store for storing the path selection configurations identified for each corresponding NLR in association with the corresponding NLR.

11. The system according to claim 10, wherein, the TE entity is configured to trigger traffic engineering (TE) in response to detecting a change in the prevailing network load by mapping the changed prevailing network load to a different one of the stored NLRs, and by causing the path selection configuration stored in association with the different one of the stored NLRs to be retrieved from the control store and implemented at nodes affected thereby.

12. The system according to claim 10, wherein the at least one control store is a central control store associated with and accessible by the TE entity.

13. The system according to claim 10, wherein the at least one control store is a distributed control store associated with and accessible by at least one of the affected nodes.

14. A traffic engineering (TE) entity for managing data flows in a network comprising a plurality of nodes, comprising:
- an NLR generator for generating one or more network load representatives (NLRs) based on an expected network load of the network, wherein the expected network node is indicative of flow demands for all the data flows in the network;
- a path optimizer for determining a path selection configuration for the data flows for each of the NLRs; and
- an NLR mapper for mapping a prevailing network load to one of the NLRs, wherein the prevailing network load of the network is indicative of prevailing flow demands for all the data flows in the network;

wherein the AF is configured to communicate with at least one control store for storing each corresponding NLR in association with the path selection identified for the corresponding NLR.

15. The TE entity according to claim 14, wherein, the TE entity is configured to trigger traffic engineering (TE) in response to detecting a change in the prevailing network load by mapping the changed prevailing network load to a different one of the stored NLRs, and by causing the path selection stored in association with the different one of the stored NLRs to be implemented at nodes affected thereby.

16. The TE entity according to claim 14, wherein the TE entity comprises a virtual network function (VNF).

17. The AF TE entity according to claim 14, wherein the TE entity comprises a software-defined network (SDN) controller (SDN-C), or forms part of a SDN-C.

18. The TE entity according to claim 14, wherein the NLR generator generates the one or more NLRs based on a statistical model of the expected load of the network, wherein the statistic model is represented by a statistical distribution and the NLRs are represented as a vector of data flow rates.

19. The TE entity according to claim 18, wherein the NLR generator comprises a vector quantizer for receiving the statistical distribution.

20. The system of claim 10, wherein the NLR generator generates the one or more NLRs based on a statistical model of the expected load of the network, wherein the statistic model is represented by a statistical distribution and the NLRs are represented as a vector of data flow rates.

21. The system of claim 20, wherein the NLR generator comprises a vector quantizer for receiving the statistical distribution.

* * * * *